Patented Feb. 10, 1942

2,272,301

UNITED STATES PATENT OFFICE 2,272,301

PREPARATION OF CATALYTIC MASSES

Ivar H. Kinneberg and Jacob Elston Ahlberg, Chicago, Ill., assignors to Universal Oil Products Company, Chicago, Ill., a corporation of Delaware No Drawing. Application June 14, 1939,
Serial No. 279,048

4 Claims. (Cl. 252—254)

This invention relates to the preparation of catalytic masses which are suitable for converting hydrocarbon oils into motor fuels of high antiknock value, and more particularly to improvements in methods of manufacturing synthetic, precipitated catalysts in order to increase their value when used in processes involving such reactions as catalytic cracking, catalytic reforming, catalytic isomerization, catalytic polymerization, etc.

Catalytic masses prepared by the precipitation of silica-alumina, silica-zirconia, silica-aluminazirconia, and other refractory oxides in conjunction with silica have been used for the catalytic conversion, and more particularly, the catalytic cracking of hydrocarbon oils. One application of this type of catalyst has been in cracking kerosene, gas oil, and similar distillates from petroleum and other sources into high yields of motor fuel having superior antiknock properties.

Among the methods which have been employed in the initial preparation of the catalytic masses of the type mentioned, are coprecipitation of the silica and the added component such as alumina, zirconia, thoria, etc. Another method consists in precipitation of silica from a solution of a soluble silicate by addition of an acid, followed by washing to remove soluble salts. A suitable salt of the metal of the compound to be incorporated is added to the suspension of the silica hydrogel in water followed by precipitation of a hydroxide by addition of a volatile alkali such as ammonium hydroxide, amomnium carbonate, etc.

According to another method, the silica hydrogel is precipitated from a solution of a soluble silicate by adding an acid thereto. The hydroxide of the component to be added to the silica is precipitated in a separate step by the addition of amomnium hydroxide to a solution of a suitable metal salt. Slurries of the two precipitated components are then mixed by stirring.

Regardless of the method used in combining the components of the catalytic mass, the precipitated mixture is filtered and thoroughly washed to remove soluble constituents, and more particularly, alkali metal ions which are detrimental if left in the catalytic mass. The washing step may be carried out before or after a preliminary drying step in which the precipitated material is heated to a temperature of approximately 300° F. to remove a major portion of the water present. The washed and dried hydrogel is then ground to pass approximately 30-mesh and is formed into various shapes such as pellets, spheres, briquets, etc.

Another method of forming the hydrogel mixture into shapes is as follows: The precipitated hydrogel is thoroughly washed to remove soluble sodium compounds, after which it is filtered to remove as much water as possible. The gelatinous filter cake is then thoroughly mixed and formed into shapes by an extrusion method. The gel is forced through a die to form a cylinder which is then cut into proper lengths to form cylindrical pellets. These pellets are then slowly dried. Considerable shrinkage occurs during this step, since the gel as extruded must contain approximately 80–90% of water.

It has been the former practice to calcine or heat treat the formed particles at a temperature of approximately the same order as that at which the catalytic mass so formed is to be used in the process. For example, it has been the practice to heat the cracking catalyst to approximately the temperature of the cracking operation, namely 800–1200° F., for a short time prior to use to remove volatile constituents.

It is with improvements in the above outlined methods and steps of catalyst manufacture that the present invention is concerned.

In one specific embodiment the present invention comprises an improvement in the methods of manufacturing catalytic masses prepared by precipitating composites consisting essentially of precipitated silica, having added thereto minor amounts of precipitated alumina, zirconia, thoria, or alumina and zirconia, washing and drying the precipitated hydrogels and forming them into shapes, said improvement comprising heating said shapes at a temperature in excess of that to be used during the processing step, namely 1300–1600° F. for a period of 0.5 to 10 hours prior to use in the process.

The preliminary steps in the preparation of catalytic masses have been outlined in the foregoing description. Ordinarily, the refractory oxide component of the catalytic mass is used in approximately 2 to 30 mol per cent of the total mixture. Thus, for example, a prepared mass may consist of 100 moles silica, 10 moles alumina, and 5 moles zirconia.

The heat treatment to which the catalytic mass is subjected should be carried out within the approximate range of 1300–1600° F. for a period of approximately 0.5 to 10 hours, and is usually carried out at a temperature of 1400–1500° F. and a period of 0.5 to 2 hours. The exact time of treatment is dependent upon the temperature used. Thus, although the catalytic masses will withstand treatment at 1600° F. for 10 hours without excessive loss of catalytic activity, there is little additional benefit if the heat treatment is extended beyond approximately 1 hour. If the treatment is carried out at 1400° F., 2 to 5 hours are necessary to attain the results desired.

The process in which catalytic masses of this type are useful include hydrocarbon cracking, gasoline reforming, organic, and particularly hydrocarbon isomerization reactions, and olefin polymerization. These processes are carried out at temperatures extending over a range of approximately 400–1200° F., and involve the use of hydrocarbon charging stocks ranging from the normally gaseous hydrocarbon such as butane and butene to relatively high boiling hydrocarbon fractions such as gas oils and the like. The exact conditions used in the processing of these hydrocarbons are, of course, dependent upon the operation to be carried out. Pressure is beneficial in certain instances and is detrimental in others.

Among the processes which are particularly benefited by the use of catalytic masses prepared according to this invention, is the catalytic cracking process wherein hydrocarbon oils are contacted with the catalytic mass at temperatures within the approximate range of 550–1200° F., and pressures substantially atmospheric or slightly superatmospheric, say of the order of 50–100 pounds per square inch. In this process the catalytic conversion of the hydrocarbon oil to motor fuel is accompanied by deposition of carbonaceous materials on the catalyst surfaces and results in reduction of catalytic activity. In order to reactivate the catalyst it is subjected to the action of oxygen-containing gas whereby the carbonaceous deposit is removed by combustion. The temperatures used in the reactivation step often exceed those used in the processing step, but are usually maintained at a point somewhat below 1400° F.

The processing and reactivation steps are carried out in the form of a continuous cycle wherein catalytic conversion is conducted over a definite period of time, followed by reactivation for a definite length of time, which may be the same or different from the time of processing. Thus, during continuous runs which may extend in commercial practice over a period of several months, the catalyst mass is maintained at a temperature which may vary over a considerable range, but is within the approximate limits of 500–1400° F.

When used in the catalytic cracking process and subjected to these severe conditions for long periods of time, the catalyst particles as formerly produced were found to undergo shrinkage. The catalyst particles are generally used as packing in tubes or reaction chambers, which are filled at the beginning of a run. As a result of shrinkage of the catalyst particles the operation of the cracking plant has been seriously disrupted at times due to the consequent change in the ratio of catalyst volume to volume of oil charged. The net result when maintaining a constant feed rate to a given plant are changes in space velocity, contact time, and consequent conversion rates as the run continues.

We have discovered that the catalyst shrinkage can be minimized, and in fact substantially eliminated, in many cases, by heat treating the catalyst particles for a limited period of time at a temperature in excess of that which is normally reached during any period in the catalyst conversion or reactivation steps prior to introduction into the catalytic process. The time and temperature of treatment, although it may be varied over a considerable range as indicated, is a primary factor in the heat treatment. Thus, extended heating at a temperature of 1500° F. or higher, results in marked decreases in the catalytic activity of the mass so treated.

For example, a silica-alumina-zirconia cracking catalyst was heat treated at 1500° F. for 1 hour, prior to use in the process. Substantially no shrinkage occurred during its subsequent use in a catalytic cracking process over a period of 60 days or more. The cracking step was carried out at a temperature of 932° F., and the reactivation step at a temperature not exceeding 1350° F. Likewise, there is no substantial change in the catalytic activity of the mass when heat treated in this way. However, when the cracking catalyst was treated at 1500° F. for a period of 72 hours, the catalytic activity in subsequent operations was found to decrease by approximately 40%. If the treatment was carried out at 1600° F. for approximately 30 minutes no substantial decrease in activity occurred. When, however, the catalyst was treated for more than 10 hours at 1600° F., a decrease of from 15–25% in catalytic activity took place. The catalyst in this case was packed in bundles or manifolded perpendicular tubes which were filled to a depth of 12 feet. At the end of 60 days' operation the depth of the catalyst bed was 11 feet 6 inches.

Prior to conducting the above-mentioned tests, a similar catalyst which had been treated for 12 hours at 1000° F. was used in the process under similar conditions. After 7 days of operation the depth of catalyst in the tubes was found to be approximately 8 feet, showing a marked decrease in volume. The run was terminated in this case because the plant was not operating satisfactorily insofar as yield of gasoline was concerned. This was found to be due to changes in operating conditions occasioned by the shrinkage of the catalytic mass.

The foregoing examples illustrate useful aspects of the present invention but should not be construed as limiting it to the exact catalytic masses or conditions of operation indicated therein.

We claim as our invention:

1. A process for manufacturing catalytic masses suitable for use in hydrocarbon conversion reactions which comprises precipitating silica from a solution of a soluble silicate, washing the resultant hydrogel, suspending said hydrogel in an excess of water, adding thereto a salt of a metal selected from the group consisting of aluminum and zirconium precipitating the hydroxide of said metal by adding thereto a volatile alkali, washing the mixture substantially free of alkali metal compounds, filtering the hydrogel mixture, extruding said hydrogel into cylindrical particles of definite size, drying the extruded particles and heating them at a temperature within the range of approximately 1300–1600° F. for a time of 0.5 to 10 hours.

2. A process for manufacturing catalytic masses suitable for use in catalytic cracking, catalytic reforming, catalytic isomerization, and catalytic polymerization of hydrocarbons which comprises precipitating silica from a solution of a soluble silicate, washing the resultant hydrogel, suspending said hydrogel in an excess of water, adding thereto a salt of a metal selected from the group consisting of aluminum and zirconium, precipitating the hydroxide of said metal by adding thereto a volatile alkali, washing the mixture substantially free of alkali metal compounds, filtering the hydrogel mixture, drying at a temperature of approximately 300° F., forming the dried material into particles of definite size and shape, and heating said particles at a temperature within the range of 1300–1600 F. for a time of 0.5 to 10 hours.

3. A process for producing catalytic masses which comprises forming a silica hydrogel from a solution of a soluble silicate, washing said hydrogel, suspending the washed hydrogel in water, adding an aluminum salt to the suspension, precipitating aluminum hydroxide from the suspension by adding thereto a volatile alkali, drying the resulting hydrogel mixture and heating the mixture at a temperature within the range of approximately 1300–1600° F. for a period of time within the range of approximately 0.5 to 10 hours.

4. A process for producing catalytic masses which comprises forming a silica hydrogel from a solution of a soluble silicate, washing said hydrogel, suspending the washed hydrogel in water, adding a zirconium salt to the suspension, precipitating zirconium hydroxide from the suspension by adding thereto a volatile alkali, drying the resulting hydrogel mixture and heating the mixture at a temperature within the range of approximately 1300–1600° F. for a period of time within the range of approximately 0.5 to 10 hours.

IVAR H. KINNEBERG.
JACOB ELSTON AHLBERG.